United States Patent Office 3,493,637
Patented Feb. 3, 1970

3,493,637
HYDROXY PHENYL PHOSPHITES
Keith Coupland, Hull, England, assignor to The Distillers Company Limited, Edinburgh, Scotland, a British company
No Drawing. Filed Aug. 24, 1966, Ser. No. 574,557
Claims priority, application Great Britain, Sept. 15, 1965, 39,387/65
Int. Cl. C07f *9/12;* C10m *1/46*
U.S. Cl. 260—927               8 Claims

ABSTRACT OF THE DISCLOSURE

Organic phosphites of formula $$\left[ \begin{array}{c} R^1 \quad OH \\ \diagup\!\!\!\diagdown \\ \diagdown\!\!\!\diagup\!\!-O \\ R^2 \end{array} \!-\! P\!-\!X \right]_n$$

wherein $n$ is 1, 2 or 3, $R^1$ is a secondary or tertiary alkyl or aralkyl in which branching occurs at the carbon atom adjacent to the benzene ring, $R^2$ is hydrogen or a hydrocarbon radical or a halo-substituted radical or halogen or a nitro group and X is $$(OR^3)_2, \quad \begin{array}{c} -O \\ \diagdown \\ -O \end{array}\!R^4, \quad \begin{array}{c} -O \quad O \\ \diagdown \quad \diagup \\ R^5 \quad P\!-\!OR^3 \\ -O \quad O \end{array}$$

or $$-O\!-\!R^6 \!\!\begin{array}{c} O \\ \diagdown \\ \diagup \\ O \end{array}\!\!P\!-\!OR^7, \quad -O\!-\!R^4\!-\!O\!-\!P \!\!\begin{array}{c} OR^8 \\ \diagdown \\ OR^9 \end{array}$$

in which $R^3$, $R^7$, $R^8$ and $R^9$ are hydrogen or a hydrocarbon radical or a halo-substituted hydrocarbon radical, $R^4$, $R^5$ and $R^6$ are a hydrocarbon radical or a halo-substituted hydrocarbon radical, and when $n$ is equal to 3, X is equal to 0, are useful as antioxidants and additives for synthetic lubricants.

---

The present invention is an organic phosphite of formula $$\left[ \begin{array}{c} R^1 \quad OH \\ \diagup\!\!\!\diagdown \\ \diagdown\!\!\!\diagup\!\!-O \\ R^2 \end{array} \!-\! P\!-\!X \right]_n$$

wherein $n$ is 1, 2 or 3 and when $n$ is 1 X is $$-(OR^3)_2,$$

$$\left[ \begin{array}{c} -O \\ \diagdown \\ -O \end{array} R^4 \right]$$

$$\left[ \begin{array}{c} -O \quad O \\ \diagdown \quad \diagup \\ R^5 \quad P\!-\!OR^3 \\ -O \quad O \end{array} \right]$$

or $$\left[ \begin{array}{c} -O \quad \quad OR^7 \\ \diagdown \quad \diagup \\ R^6\!-\!O\!-\!P \\ -O \quad \quad OR^8 \end{array} \right]$$

and when $n$ is 2 X is $$-(OR^3)$$

$$\left( -O\!-\!R^6\!\!\begin{array}{c} O \\ \diagdown \\ \diagup \\ O \end{array}\!\!P\!-\!OR^7 \right)$$

or $$\left( -O\!-\!R^4\!-\!O\!-\!P\!\!\begin{array}{c} OR^8 \\ \diagdown \\ OR^9 \end{array} \right)$$

and wherein $R^1$ is a secondary or tertiary alkyl or aralkyl group in which branching occurs at the carbon atom adjacent to the benzene ring, $R^2$ is hydrogen, a hydrocarbyl group, a halohydrocarbyl group, a halogen or a nitro group, $R^3$, $R^7$, $R^8$ and $R^9$ are hydrogen, hydrocarbyl radicals or halohydrocarbyl radicals, And $R^4$, $R^5$ and $R^6$ are hydrocarbyl or halohydrocarbyl groups.

By a hydrocarbyl radical is meant any radical which may be derived from a hydrocarbon by loss of a hydrogen atom, for example an alkyl, aryl, aralkyl, alkenyl, cycloalkyl or cycloalkenyl radical.

These compounds may be used as antioxidants and antiwear additives for synthetic lubricants, hydrocarbon lubricants, greases and plastic compositions. They may be used in diester lubricants derived from dicarboxylic acids and polyesters derived from polyhydroxy compounds, for example trimethylol propane-triesters, pentaerythritol tetra-esters and dipentaerythritol-hexa-esters. The lubricants may also contain additives such as dispersant and detergent additives, viscosity index improvers and pour point depressants.

The group $R^1$ may suitably contain from 3 to 20 carbon atoms and can be isopropyl, tert-butyl or α,α-dimethylbenzyl, for example.

The group $R^2$, which, when hydrocarbyl, may suitably contain up to 20 carbon atoms, can occupy the 5-position, for example (i.e. the position diametrically opposite the hydroxyl group). Examples of the group $R^2$ include methyl, tert-butyl, α,α-dimethylbenzyl, phenyl, Cl and Br.

The groups $R^3$ to $R^9$ may suitably be any alkyl group, for example those containing up to 9 carbon atoms. They can alternatively be a phenyl group, unsubstituted or substituted with one, two or three $R^2$ groups.

Another aspect of the present invention is a process for the preparation of an organic phosphite of the above formula which comprises reacting one mole of an organic phosphite of formula $P(OR)_3$, in which R represents a lower alkyl group or a lower haloalkyl group having up to 9 carbon atoms, with one, two or three moles of a substituted catechol of formula $$\begin{array}{c} R^1 \quad OH \\ \diagup\!\!\!\diagdown \\ \diagdown\!\!\!\diagup\!\!-OH \\ R^2 \end{array}$$

where $R^1$ and $R^2$ have the significance mentioned above. R can be for example tert-butyl or 2-chloroethyl.

A catalyst may be used to facilitate this reaction. A useful catalyst is a dialkyl phosphite, of for example the formula $HOP(OR)_2$, where R has the significance noted above.

Such a process for the preparation of the organic phosphite of the formula first mentioned above will produce the lower alcohol of formula ROH, liberated by the reaction of the organic phosphite of formula $P(OR)_3$ with the substituted catechol. This can be removed, for example, by distillation.

After distilling off the lower alcohol ROH, the resultant reaction mixture may be further reacted with a mono or polyhydroxy compound in order to replace any remaining —OR groups. Most suitably the hydroxy compound has a higher boiling point than the lower alcohol ROH, in order that the lower alcohol may be conveniently removed, for example, by distillation. Suitable monohydroxy compounds include phenol and polyhydroxy compounds include ethylene glycol, propylene glycol, butylene glycol, hexylene glycol, pentaerythritol, trimethylol propane and neopentyl glycol.

Where the desired final product contains two phosphite ester groups the phosphite ester starting material is reacted with the catechol and the product is subsequently reacted with a polyhydroxyl compound in the manner described above. The product of this reaction, which must have at least one hydroxyl group, is then further reacted with more phosphite ester to give a product having two phosphite ester groups.

These reactions are suitably carried out in an inert medium, which preferably forms an azeotrope with the lower alcohol ROH, for example toluene.

The following examples illustrate the invention.

EXAMPLE 1

The following reactants are charged to a flask fitted with a stirrer, thermometer and a short fractionating column packed with glass helices.

50 g. tri-n-butyl phosphite
18.8 g. phenol
88.0 g. 3:5 di-t-butyl catechol
1.0 ml. di-n-butyl phosphite
200 ml. toluene The resulting mixture is stirred and brought to a kettle temperature of about 120° C., at which point distillation of toluene:n-butanol azeotrope begins. Heating of the kettle is controlled by the head temperature, this being maintained below 108° C. (B.P. of toluene:n-butanol azeotrope is 106° C.). When all the n-butanol has been removed as azeotrope, a further 20 ml. of toluene is removed, and the flask contents cooled to 10° C. The resulting crystallised product is removed by filtration, washed with a little cold toluene and dried. The product thus obtained, in a yield of 80%, has a melting point of 192–194° C.

EXAMPLE 2

In a modification of the method of Example 1, using the same apparatus, reactants and quantities, the tri-n-butyl phosphite, phenol, di-n-butyl phosphite and toluene are charged to the flask and heated to 120° C. until all the n-butanol has been distilled off as its azeotrope with toluene. The catechol is then added, and the heating continued until the remainder of the toluene is removed. On cooling, colourless crystals melting at 199° C. were obtained in good yield. The infra red spectrum of the product is consistent with the structure bis(2-hydroxy-3:5-ditertbutylphenyl) phenyl phosphite. Elemental analysis gave 5.4% P, in good agreement with that required for $C_{34}H_{47}O_5P$, 5.48%.

EXAMPLE 3

(3,5-ditertbutyl-2-hydroxypehnyl) diphenyl phosphite was reacted with (a) pentaerythritol and (b) tris-(n-butyl) phosphite by the method described in Example 1. A white crystalline solid remained when the toluene was removed. This material is essentially that illustrated below (confirmed by spectroscopic examination).

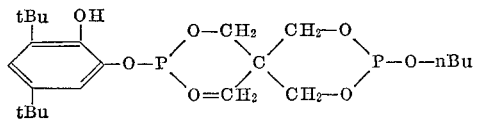

EXAMPLE 4

The material of Example 3 was reacted with phenol in the manner of Example 1 to give:

3 - (2 - hydroxy-3:5-ditert butyl phenyl)-9-phenyl-2:4:8:10 tetra oxa-3:9-diphospha-spiro-5:5-undecane

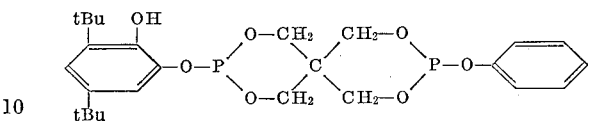

EXAMPLE 5

The general procedure of Example 2 was followed except that 3-tert butyl-5-methyl catechol was used in place of 3:5:ditert butyl catechol. The product remaining was a dark coloured oil which responded to charcoal treatment to give a viscous amber liquid consisting essentially of

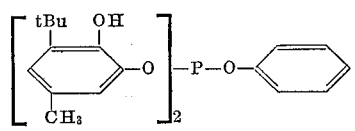

EXAMPLE 6

The antioxidant activity of the material of Example 2 was tested in a laboratory oxidation/corrosion test.

The table below shows that the product has an antioxidant activity similar to that of a commercially available phenolic antioxidant (Ethyl 702) when used at half the concentration of the latter.

| Formulation: | Induction period [1] before the onset of corrosion (h) |
|---|---|
| (1) An S.A.E. 30 grade base oil | 0 |
| (2) As 1.+2% of an ashless dispersant | 0 |
| (3) As 2.+0.25% Ethyl 702 | 6.0 |
| (4) As 2.+0.125% material Example 2 | 6.4 |

[1] An induction period of 6 hours corresponds to a pass result in the Petter W.1. test (less than 25 mg. bearing weight loss in the Petter engine after 36 hours).

EXAMPLE 7

The antiwear activity of the compounds was tested as follows. A mineral oil lubricant containing 0.25% phosphite ester of Example 2 and 2% of an ashless dispersant additive increased the weld load in a 4-ball test (steel on steel balls) from 160 kg. to 200 kg. in a 10 sec. test. This increase is comparable with that of Lubricant A, a conventional commercially available lubricant. The dispersant additive has no effect on the weld load of the oil.

A 4-ball test was run for 30 sec. with a load of 50 kg. (steel on steel balls) and the resultant wear scar measured. The table below illustrates the decrease in wear scar experienced with synthetic lubricants containing the useful products of this invention.

| | Mean Wear Scar Diameter (mm.) |
|---|---|
| Dioctyl sebacate | 0.373 |
| Dioctyl sebacate+1% material of Example 2 | 0.217 |
| Trimethylol propane tricaprylate | 0.308 |
| Trimethylol propane tricaprylate+1% material of Example 4 | 0.140 |

I claim:
1. An organic phosphite of formula:

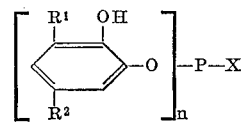

wherein $n$ is 1, 2 or 3 and when $n$ is 1 X is $(-OR^3)_2$ or

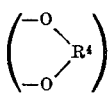

or

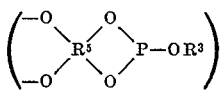

or

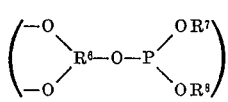

and when $n$ is 2 X is

or

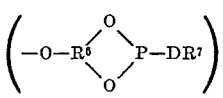

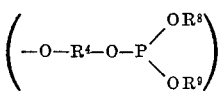

and when $n$ is 3, X is O, and wherein $R^1$ contains between 3 and 20 carbon atoms and is a secondary or tertiary alkyl or aralkyl in which branching occurs at the carbon atom adjacent to the benzene ring, $R^2$ is hydrogen, alkyl of up to 20 carbon atoms or alkyl of up to 20 carbon atoms substituted by chlorine or bromine or chlorine or bromine or nitro, $R^3$, $R^7$, $R^8$ and $R^9$ are hydrogen or alkyl of up to 9 carbon atoms or phenyl substituted by chlorine or bromine or alkyl of up to 9 carbon atoms, and $R^4$, $R^5$ and $R^6$ are alkyl of up to 9 carbon atoms or alkyl of up to 9 carbon atoms substituted by chlorine or bromine or phenyl.

2. Compounds according to claim 1 wherein $R^1$ is an isopropyl, tert-butyl, or α,α-dimethylbenzyl radical.

3. Compounds according to claim 1 wherein $R^2$ is methyl, tert-butyl, α,α-dimethylbenzyl, phenyl, chlorine or bromine.

4. Compounds according to claim 1 wherein $R^3$ and $R^7$ to $R^9$ are phenyl groups substituted with one, two or three $R^2$ groups, and $R^4$, $R^5$ and $R^6$ are alkyl groups of up to 9 carbon atoms.

5. An organic phosphite according to claim 1 of formula

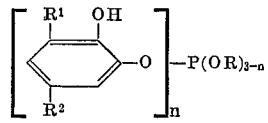

wherein $n$ is 1, 2 or 3, $R^1$ and $R^2$ are as defined in claim 1 and R is hydrogen or lower alkyl of up to 9 carbon atoms or alkyl of up to 9 carbon atoms substituted by chlorine or bromine.

6. The compound bis(2 - hydroxy - 3.5 - ditertbutyl - phenyl) phenyl phosphite.

7. The compound of formula

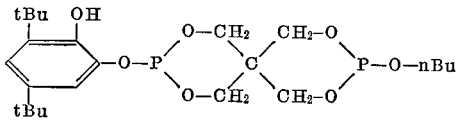

8. The compound 3 - (2 - hydroxy - 3:5 ditertbutyl - phenoxy) - 9 - phenoxy - 2:4:8:10 - tetra oxa - 3:9 - diphospha - spiro - 5:5 undecane of formula:

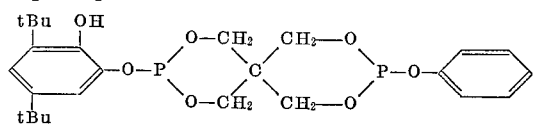

References Cited
UNITED STATES PATENTS

| | | | |
|---|---|---|---|
| 2,293,445 | 8/1942 | Nelson | 260—953 X |
| 3,257,355 | 6/1966 | Bean | 260—927 X |
| 3,205,250 | 9/1965 | Hechenbleikner | 260—927 |
| 3,310,609 | 3/1967 | Baranauckas et al. | 260—927 |
| 3,356,770 | 12/1967 | Larrison | 260—928 X |

CHARLES B. PARKER, Primary Examiner

RICHARD L. RAYMOND, Assistant Examiner

U.S. Cl. X.R.

252—49.8, 49.9, 400; 260—928, 936, 937, 953, 982